July 20, 1937.  A. MASTRANGELO  2,087,804
RESILIENT WHEEL
Filed Sept. 8, 1936
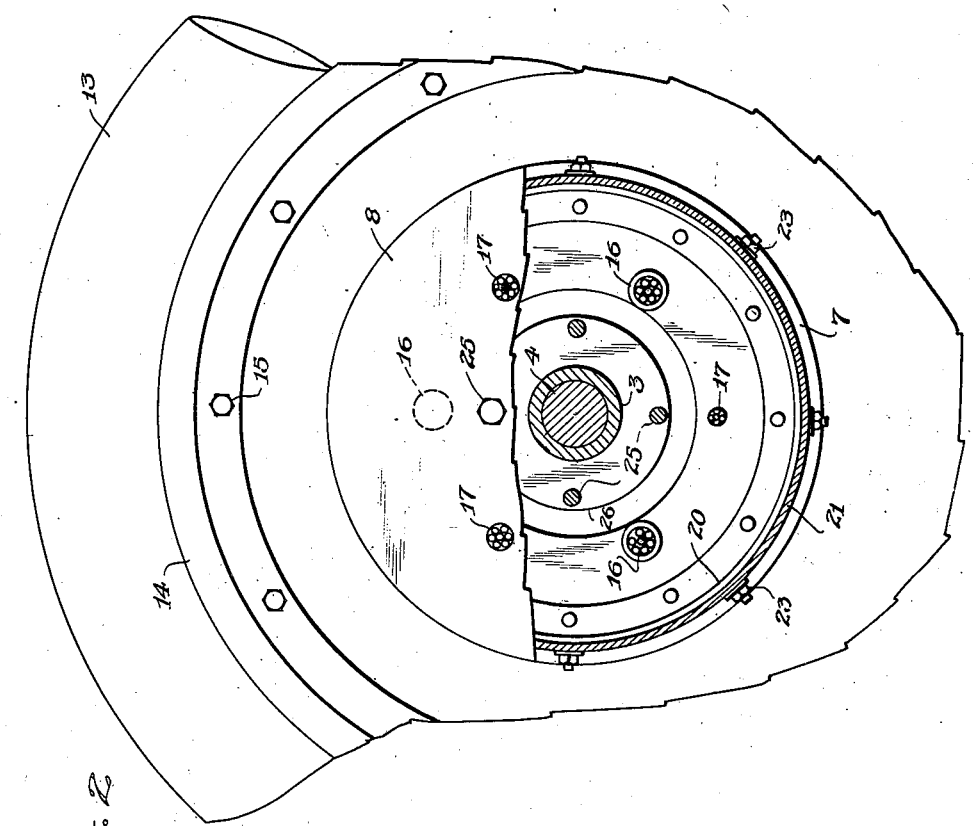
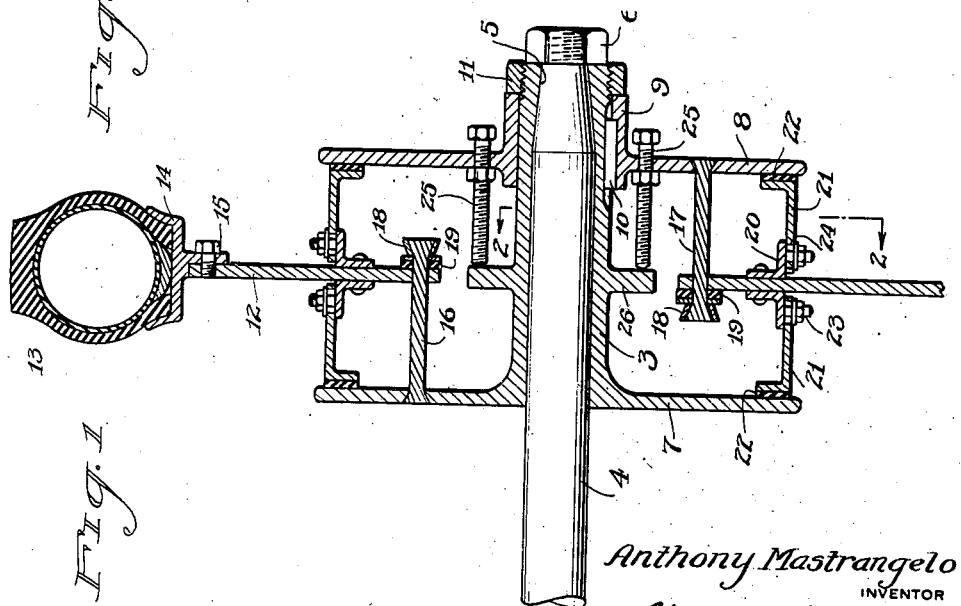
Anthony Mastrangelo
INVENTOR
BY Victor J. Evans & Co.
ATTORNEYS Patented July 20, 1937

2,087,804

UNITED STATES PATENT OFFICE 2,087,804

RESILIENT WHEEL

Anthony Mastrangelo, Secaucus, N. J.

Application September 8, 1936, Serial No. 99,842

1 Claim. (Cl. 152—28)

The present invention relates to vehicle wheels and particularly to devices of this character presenting a resilient mounting of the wheel tire on to the hub thereof.

The general object of the invention is to provide an improved wheel construction wherein a resilient suspension of the wheel, connecting same to the hub, affords a cushioning action for the absorption of road shocks and other strains occurring during the travel of the vehicle.

Another object of the invention resides in the provision of a resilient vehicle wheel comprising tension elements to effect the cushioning of road shocks, the same including means by which the tension of the mentioned elements may be adjusted at will to suit the operating conditions obtaining.

A further object is to provide a novel construction of vehicle wheel wherein the tire supporting elements of the wheel attain a floating action as the vehicle proceeds over rough roads, the same being effective for cushioning the road shock imparted to the hub, the axle or other supporting elements of the wheel.

The invention will be fully and comprehensively understood from a consideration of the following detailed description when read in connection with the accompanying drawing which forms part of the application.

In the drawing:

Fig. 1 is a fragmentary transverse sectional view thru a typical wheel including the suspension structure of the invention; and Fig. 2 is a fragmentary side elevation of the wheel, portions thereof being broken away in section.

In the physical embodiment of the invention illustrated in the drawing, there is provided a pair of parallel flanges disposed radially from the axle, a wheel disk disposed between the mentioned flanges and tension elements connecting the wheel disk and the parallel flanges to form resilient suspension for the wheel, one of the flanges providing means for adjustment of the tension elements, the wheel disk being guided for radial movement between the parallel flanges.

Referring now to the drawing for a detailed description thereof, the numeral 3 indicates a hub connected to a drive axle 4 by suitable means as the tapered connection 5 including the nut 6. In the arrangement illustrated, the wheel is adapted for use on the drive axle of the vehicle. It will be apparent that same may be adapted to the front wheels of a vehicle by mounting the hub 3 to rotate relative to the axle 4.

Integral with the hub 3 is formed a radial back flange 7 in parallelism with which is arranged a front flange 8. The front flange 8 is adjustably mounted on the hub 3 for movement to and from the flange 7 by being provided with a hub 9 mounted on the hub 3 for axial movement thereon as by the slide key 10. The front flange 8 is retained in adjusted position by suitable means such as the nut 11, the latter being threadedly carried on the hub 3.

A wheel disk 12 is disposed between the radial flanges 7 and 8, and includes supporting means for a tire 13 preferably comprising a tire rim 14 secured to the wheel disk 12 as by a series of cap screws 15.

The wheel disk 12, extending inwardly between the flanges 7 and 8 is resiliently suspended thereon by a plurality of tension members 16 and 17, the latter being disposed in substantial parallelism with the axis of the wheel. The tension members 16 have their respective ends secured to the disk 12 and the back flange 7, and the tension members 17 have their respective ends secured to the disk 12 and the front flange 8, the members 17 being disposed alternately between the members 16 as shown in Fig. 2. The tension members 16 and 17 are preferably formed of wire cables and have their respective ends secured to the flanges 7 and 8 by being inserted in tapered holes therein, the strands of the cables being expanded within the holes. The ends of the members 16 and 17, connected to the wheel disk 12 are secured thereto by having the strands of the cables expanded into a tapered collar 18, the latter being cushioned on to the wheel disk 12 by a resilient washer 19. From the foregoing it will be seen that during the travel of the vehicle, the wheel disk 12 will take a floating action, being resiliently suspended between the flanges 7 and 8 by the tension members 16 and 17, the same permitting radial movement of the wheel disk 12. The wheel disk 12 is guided between the flanges 7 and 8 by providing oppositely projecting ring flanges 20 on the wheel disk 12, on which flanges are adjustably secured guide cylinders 21. The cylinders 21 are each flanged inwardly to provide a broad contact surface on to the respective flanges 7 and 8, a resilient ring 22 being disposed between these members to cushion the movement thereof. The cylinders 21 are adjustably mounted on the respective flanges 20 by being secured thereto by means of stud screws 23, the latter being disposed in elongate slots 24 cut in the cylinders 21.

The required tensioning of the tension members 16 and 17 is coactively effected by movement of the flange 8 relative to the flange 7 and is preferably carried out by providing a series of adjustment screws 25 threadedly carried in the flange 8 and having their ends engaging a collar 26 integral with the hub 3.

In the preferred method of adjustment to attain the desired tension of the members 16 and 17, the cylinders 21 are loosened from the flanges 20, after which the several screws 25 are turned against the collar 26 until the desired tension of the members 16 and 17 is attained, the nut 11 being unscrewed sufficient to permit sliding of the flange 8 on the hub 3. When the desired adjustment is attained the nut 11 is again tightened to fix the adjustment. The positions of the respective cylinders 21 on the flanges 20 are adjusted by moving the cylinders 21 axially until their flanged ends slightly compress the rings 22, after which the screws 23 are tightened to fix the position of the cylinders 21. In this manner the wheel disk 12 is resiliently carried on the hub 3 being guided for radial movement between the flanges 7 and 8.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claim.

What is claimed as new is:

A resilient wheel comprising a hub and a first flange integral therewith, a second flange disposed in spaced parallelism with said first flange and adjustably carried on said hub, a wheel disk disposed between said first and second flanges, tension elements suspending said wheel disk on said first and second flanges, and means for moving said first flange to and from said second flange whereby to vary the tension of said tension elements, said means comprising screws threadedly carried in said second flange and engaging said hub.

ANTHONY MASTRANGELO.